United States Patent [19]
Kim

[11] Patent Number: 5,003,560
[45] Date of Patent: Mar. 26, 1991

[54] RECEIVING COUNTER PHASE SYNCHRONIZATION CIRCUIT OF THE SYNCHRONOUS TRANSMISSION SYSTEM

[75] Inventor: Bong T. Kim, Daejeon, Rep. of Korea

[73] Assignees: Electronics and Telecommunication Research Institute, Daejeon; Korea Telecommunication Authority, Seoul, both of Rep. of Korea

[21] Appl. No.: 449,778

[22] Filed: Dec. 11, 1989

[30] Foreign Application Priority Data

Dec. 14, 1988 [KR] Rep. of Korea ................ 1988-16678

[51] Int. Cl.⁵ .............................................. H04L 7/04
[52] U.S. Cl. .................................... 375/111; 307/511; 307/526; 375/119
[58] Field of Search ................ 375/111, 114, 118–120; 307/510, 511, 514, 526, 527, 528; 328/133, 155

[56] References Cited

U.S. PATENT DOCUMENTS 4,868,512 9/1989 Bridgman ........................... 307/511

Primary Examiner—Douglas W. Olms
Assistant Examiner—Marianne Huseman
Attorney, Agent, or Firm—Blakely, Sokoloff, Taylor & Zafman

[57] ABSTRACT

The invention provides a receiving counter phase synchronization circuit of the synchronous transmission system, the circuit comprising first line transmitting the signals of logic status according to whether or not synchronization pattern is detected in the serial bit stream; second line transmitting the pre-existence phase information of the receiving counter; a D flip-flop circuit for outputting the delayed data under the control of a clock signal; first NOR logic device connected to the output line of said D flip-flop circuit and said second line; second NOR logic device connected to said first NOR logic and said first line, and having its output line connected to said the data input node of said D flip-flop circuit; an inverter connected to said first line; and an OR logic device connected to the output line of said inverter and that of said first NOR logic device.

1 Claim, 2 Drawing Sheets

RECEIVING COUNTER PHASE SYNCHRONIZATION CIRCUIT OF THE SYNCHRONOUS TRANSMISSION SYSTEM

BACKGROUND OF THE INVENTION

The present invention relates to a phase synchronization circuit, and more particularly relates to a receiving counter phase synchronization circuit which synchronizes the phase of the receiving counter to that of the synchronization patterns included in the received bit stream of a synchronous transmission system.

When the multiplexed serial bit stream is transmitted in the Synchronous Transmission Mode (STM) in a digital multiplexing system, the frame information for classfying the received serial bit stream at the receiving terminal is included in the transmitted multiplexed serial bit stream.

This transmission system is widely applied for the telephone switching network or the long distance transmission between various data networks.

In this transmission systems, however, there are an asynchronous system and a synchronous system, the one transmits the predetermined data pattern nonperiodically and the other transmits that periodically.

In the case of making use of the synchronous system, a synchronization circuit is required, which synchronizes quickly and effectively the phase of the receiving counter offering the timing signal for classfying the received bit stream at the receiving terminal, to the phase of the synchronization pattern included in the bit stream.

However, in the telephone switching networks or the data communication networks, the phase synchronous circuits have been greatly investigated and developed on the standardized transmission speed and form, but those circuits could not be in general applied to for the unstandardized transmission speed and form.

SUMMARY OF THE INVENTION

An object of the invention is to provide a phase synchronization circuit which can minimize the information loss of the synchronous transmission system by keeping the pre-existing phase information of the receiving counter, in any case of temporary coincidence with the predetermined synchronization pattern between the transmitter and the receiver by random data or any deteriorations from genuine synchronization pattern due to the transmission line errors, and consequently make usable widely for the diverse transmission speed and form.

Accordingly, in order to accomplish the above objects and solve such conventional problems, this invention provides a phase synchronization circuit comprising first line transmitting the signals of logic status according to whether or not synchronization pattern is detected in the serial bit streams;

second line transmitting the pre-existence phase information of the receiving counter;

a D flip-flop circuit for outputting the delayed data under the control of a clock signal;

first NOR logic device connected to the output line of said D flip-flop circuit and said second line;

second NOR logic device connected to said first NOR logic device and said first line, and having its output line connected to said the data input node of said D flip-flop circuit;

an inverter connected to said first line;

and an OR logic device connected to the output line of said inverter and that of said first NOR logic device.

BRIEF DESCRIPTION OF THE DRAWINGS

The invention will be readily understood from the following more detailed description presented in conjunction with the following drawings, in which:

FIG. 1 is a block diagram for explaining the construction of the system which the invention is applied to;

DETAILED DESCRIPTION OF THE PREFERRED EMBODIMENT

Figure 1:
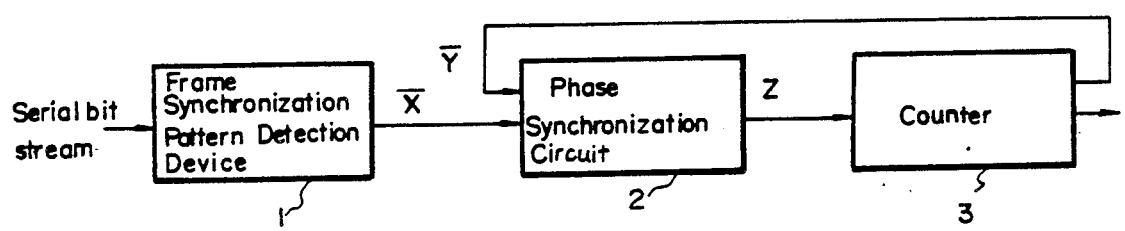
Figure 2:
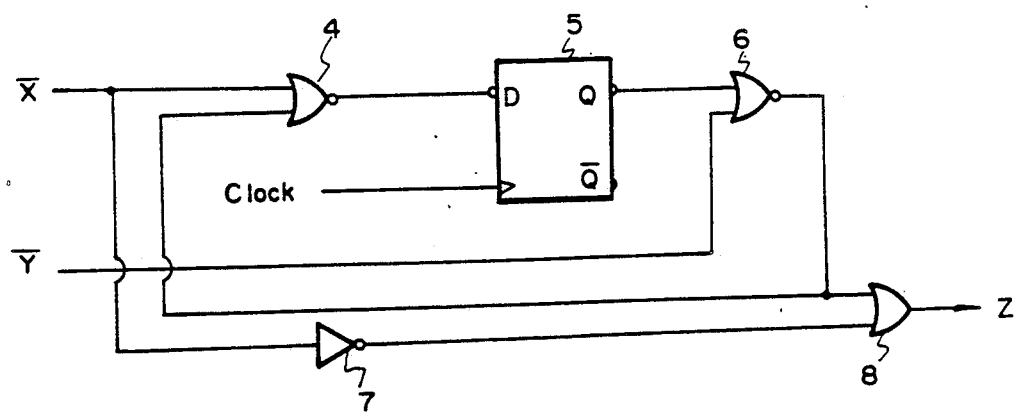
FIG. 2 is a detailed construction diagram of the invention.
Figure 3:
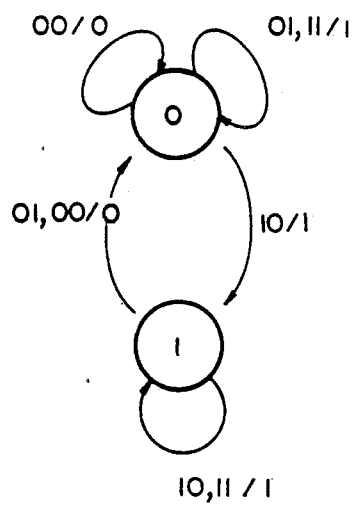
FIG. 3 is a state transition diagram showing the operating status of the invention.
Figure 4:
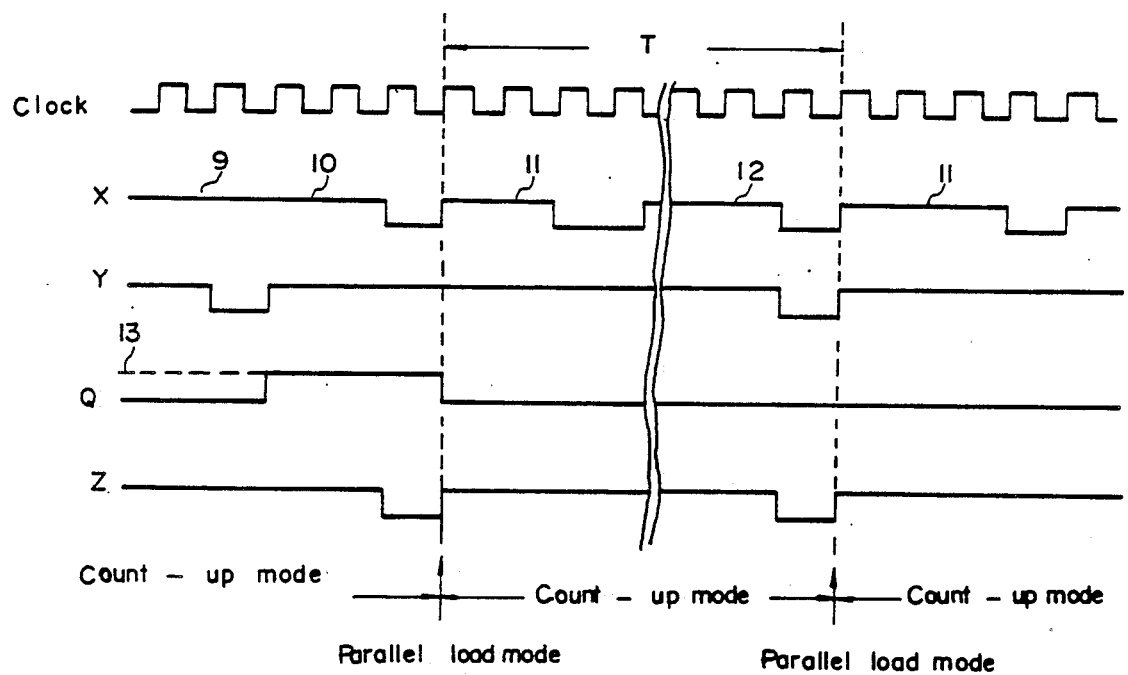
FIG. 4 is a timing diagram showing the phase synchronization procedure of the invention.

FIG. 1 is the block diagram for explaining functions of the invention, FIG. 2 the detailed diagram, FIG. 3 the state transition diagram showing the operating status of the invention, and FIG. 4 the timing diagram showing the phase synchronization process.

In the drawings, X is the output signal of a frame synchronization pattern detection device 1, and it indicates the logic state of the output signal that is logic signal "0" when the predetermined synchronization pattern is detected in the serial bit streams and that is logic signal "1" otherwise. Y indicates the feedback signal from a counter 3, that is, the pre-existing phase information from the counter 3. Z is the output signal determined in a phase synchronization circuit 2, and also indicates the signal that controls the counter 3 by the parallel load mode when the logic state is "0" and by the count-up mode when the logic state is "1". The term "parallel load" in a counter means that the counter is reset synchronously to the clock signal. That is, in the parallel load mode, the counter is first reset to a predetermined setup value and then counting is initiated responsive to the clock signal.

In FIG. 1, The frame synchronization pattern detection device 1 carries out the function for detecting the predetermined synchronization pattern in the received serial bit streams, and sends that result as the output signal to the phase synchronization circuit 2.

The output signal X from the frame synchronization pattern detection device 1 and the feedback signal Y from the counter 3 are inputted to the circuit 2.

At this time, in the case the prescribed synchronization pattern is detected within the interval T of the counter 3, the phase synchronization circuit 2 has one function that makes the output signal Z to "0" and controls the counter 3 in the parallel load mode and supplies the synchronized timing signals to a system for classfying the multiplexing data.

In the case the prescribed synchronization pattern is not detected, the circuit 2 has another function that makes the output signal Z to "1" and controls the counter 3 in count-up mode and keeps on counting until the prescribed synchronization pattern is detected within the interval T.

In the case the synchronization pattern is detected accidentally due to random data pattern on the transmission line, this circuit 2 has the other function that keeps the counter 3 in the count-up mode and keeps on counting repeatedly until the prescribed synchronization pattern is detected.

The counter 3 carries out the function that feedbacks the feedback signal Y of the counter 3 having the same interval as the output signal X of the frame synchronization pattern detection device 1 to the phase synchronization circuit 2, and that receives the control signal Z from the circuit 2 and that operates according to the count-up mode and the parallel load mode, and that sends the timing signals synchronized to this input signal Z into the system for classifying the received serial bit stream.

FIG. 2 is a detailed circuit diagram of the invention.

The NOR gate 4 carrys out the function that inputs the output signal X of the frame synchronization pattern detection device 1 and together with the output of the NOR gate 6, and outputs the output signal of the logic state 1 to D node of the D flip-flop 5 only if both input signals are "0".

The D flip-flop 5 carrys out the function that in the case the output signal of the NOR gate 4 and the clock signal are applied, makes the condition which can operate the counter 3, and that outputs it to the NOR gate 6.

That is, the control signal Z of the counter 3 is "1" only if the output Q of the D flip-flop 5 is "0".

The NOR gate 6 inputs the output of said D flip-flop 5 together with the phase information signal Y of the counter 3, and has the function that outputs the output signal of the logic state "1" to the OR gate 8 only if both input signals are "0"

The inverter 7 has as an input signal X. The OR gate 8 inputs the output signal of the NOR gate 6 together with the output signal of inventer 7 and carrys out the function that outputs the control signal Z to the counter 3.

With reference to the state transition diagram of FIG. 3 and the timing diagram of FIG. 4, the operation of the invention will be explained in detail below.

It is first of all considered that the initial state of the D flip-flop 5 is "0". First, in the case the signals X and Y are "0" and "0" respectively, that is, the phase of the synchronization pattern and the phase of the counter 3 are synchronized, the D flip-flop 5 maintains the state "0" the signal Z becomes "0", and the counter 3 is operated as the parallel load mode.

This state is shown in the part 12 of FIG. 4.

Second, in the case the input signals X and Y are "0" and "0" or "1" and "1" respectively, the output Q of the D flip-flop 5 keeps on the state "0" and the signal Z becomes "1", and the counter 3 is operated as the count-up mode.

This state is shown in the parts 10 and 11 of FIG. 4.

Third, in the case the input signals X and Y are "1" and "0" respectively, that is, among the input bit streams the synchronization pattern is not detected after the interval T from an arbitrary synchronization pattern.

In this case, since the phase of the pattern assumed initially cannot be considered as the phase of a practical synchronization signal, the output state Q of the D lip-flop 5 is changed from "0" to "1" and the D flip-flop 5 is waiting for new synchronization pattern.

At this time, the signal Z becomes "1" and controls the counter 3 in the count-up mode.

This state is shown in the part 9 of FIG. 4.

On the other hand, in the case that the initial state of the D flip-flop 5 is "1", its operation is as follows.

First, in the case the input signals X and Y are "0" and "0" or "0" and "1" respectively, the D flip-flop 5 is waiting for the position of the new synchronization pattern, the output Q of the D flip-flop 5 is changed from "1" to "0", and the signal Z becomes "0" and operates the counter 3 in the parallel load mode.

This state is shown in the part 13 of FIG. 4, but a dotted line means the case that the initial state of the D flip-flop 5 is "1".

Second, in the case that input signals X and Y are "1" and "1" or "1" and "0" respectively, the output state Q of the D flip-flop 5 is waiting for the synchronization patterns on keeping "1" state as it is.

At this time the signal Z becomes "1" and operates the counter 3 on counting.

This state is shown in the parts 9 and 10 of FIG. 4.

The receiving counter phase synchronization circuit of the synchronous transmission system which is comprised by above construction has the particular effects as the followings.

First, the present invention is used in synchronizing the phase of the counter 3 to that of the synchronization pattern by controlling only the count-up or parallel load mode which is the basic mode of the conventional counter chip, and keeps the past phase information which is kept in the counter in spite of the loss of the temporary synchronization pattern owing to the line error, etc., it minimizes the loss of data consequently.

Second, the invention can synchronize quickly and effectively the phase of the receiving counter to the phase of synchronization signal though an unstandardized transmission speed and form is transmitted and then its application area is wide and it becomes reliable.

That is, from several KHz up to several hundreds MHz (approximately 250 MHz) in transmission speed, the invention can be applied widely.

Also, the invention can be utilized in the interface unit of all the digital systems making use of a the synchronous system, while the phase synchronization chips manufactured commercially and used at standardized transmission speed cannot be utilized at diverse speeds.

What is claime as:

1. A receiving counter phase synchronization circuit in a synchronous transmission system used to transmit serial bit streams, the circuit comprising:
   a detecting means;
   a first line for transmitting signals of logic status data according to whether or not a synchronization pattern is detected in the serial bit streams by the detecting means;
   a second line for transmitting pre-existing phase information of a receiving counter;
   a first NOR logic device connected to the output line of a D flip-flop circuit and said second line, said first NOR logic device having an output;
   a second NOR logic device connected to the output of said first NOR device and to said first line, and having its output line connected to a data input node of said D flip-flop circuit;
   said D flip-flop circuit delaying the data from said second NOR logic device under the control of a clock signal;
   an inverter connected to said first line;
   and an OR logic device connected to the output line of said inverter and that of said first NOR logic device.

* * * * *